United States Patent [19]

Eichel et al.

[11] Patent Number: 4,924,229
[45] Date of Patent: May 8, 1990

[54] PHASE CORRECTION SYSTEM FOR AUTOMATIC FOCUSING OF SYNTHETIC APERTURE RADAR

[75] Inventors: Paul H. Eichel, Albuquerque; Dennis C. Ghiglia, Placitas; Charles V. Jakowatz, Jr., Albuquerque, all of N. Mex.

[73] Assignee: The United States of America as represented by the United States Department of Energy, Washington, D.C.

[21] Appl. No.: 407,088

[22] Filed: Sep. 14, 1989

[51] Int. Cl.$^5$ .............................................. G01S 13/90
[52] U.S. Cl. ...................................................... 342/25
[58] Field of Search ......................... 342/25, 191, 175

[56] References Cited

U.S. PATENT DOCUMENTS 4,617,567 10/1986 Chan ........................................ 342/25
4,771,287 9/1988 Mims ....................................... 342/25

OTHER PUBLICATIONS

W. Brown and D. Ghighlia, "Some Methods for Reducing Propagation-Induced Phase Errors in Coherent Imaging Systems, I. Formalism", *Journal of the Optical Society of America*, vol. 5, Jun. 1988, pp. 924–941.

Primary Examiner—Thomas H. Tarcza
Assistant Examiner—Mark Hellner
Attorney, Agent, or Firm—James H. Chafin; William R. Moser; Richard E. Constant

[57] ABSTRACT

A phase gradient autofocus system for use in synthetic aperture imaging accurately compensates for arbitrary phase errors in each imaged frame by locating highlighted areas and determining the phase disturbance or image spread associated with each of these highlight areas. An estimate of the image spread for each highlighted area in a line in the case of one dimensional processing or in a sector, in the case of two-dimensional processing, is determined. The phase error is determined using phase gradient processing. The phase error is then removed from the uncorrected image and the process is iteratively performed to substantially eliminate phase errors which can degrade the image.

33 Claims, 6 Drawing Sheets

PHASE CORRECTION SYSTEM FOR AUTOMATIC FOCUSING OF SYNTHETIC APERTURE RADAR

FIELD OF THE INVENTION

The present invention is directed to an improvement in synthetic aperture imagery techniques, and more particularly, to the correction of arbitrary phase errors resulting in image defocusing, particularly in synthetic aperture radar.

BACKGROUND OF THE INVENTION

Synthetic aperture radar (SAR) is primarily used as a radar mapping technique for generating high resolution images of a desired imaging area such as a desired geographic area. Synthetic aperture radar imagery is well known and is often used for terrain mapping, particularly in remote areas accessible only from the air. Synthetic aperture radar imaging techniques are often utilized in both aircraft based and space based systems for this purpose.

It is well known in the radar art that the resolution of a conventional radar system can be enhanced by increasing the effective antenna length. In order to increase radar image resolution, linear antenna arrays have been utilized having a plurality of antenna elements functioning together to increase an effective antenna length. Synthetic aperture radar, however, typically utilizes a single antenna element which traverses a path extending across the area to be imaged. By traversing the area to be imaged with the radar antenna, the antenna is synthetically lengthened to increase the effective antenna length enabling increasing image detail to be resolved.

As will be explained further hereinbelow with reference to the preferred embodiments, synthetic aperture radar determines the range to a target object from the time delay between the generation of an interrogation pulse and receipt of a position indicating reflection. A typical system may utilize linear FM chirped pulses having a linearly varying carrier frequency. In such a case the reflection delay which is indicative of distance is determined by the frequency of the received radar reflection upon proper demodulation.

Azimuth or cross range is more difficult to determine accurately, however. The azimuth resolution of a conventional antenna is limited to the transmitted beam width. However, in synthetic aperture radar the phase shift between successive position-indicating reflections can accurately establish the azimuth or cross-range position of received reflections. In order to accurately image a desired area, it is important for such a synthetic aperture system to accurately know the path which the antenna travels. Accordingly, as in the FIG. 1 embodiment of the present invention, an aircraft's inertial navigation system is often utilized to develop an accurate aircraft track. This is sufficient for accurate and continuous determination of the position of the radar antenna and also allows an accurate determination of range to the target of interest, as such range is measured through measurement of the time delay between transmission of a radar interrogation pulse and receipt of the reflection therefrom. Only minor range errors therefore occur due to errors in the position of the antenna. However, antenna track errors are considerably more serious in their effect on azimuth, or crossrange measurements due to the manner in which these measurements are made.

In synthetic aperture radar, the target area is typically interrogated by sequentially transmitted radar pulses. Azimuth or cross-range is resolved by coherently integrating echo energy reflected from the target area as the aircraft carrying the radar travels past the target area. In sequential samples of the target area from an aircraft following a linear track, the reflections from a single target element differs in phase from each other due to the change in distance from the reflected object caused by traversal of the mapping aircraft. These changes in phase are indicative of azimuthal position of the target with respect to the mapping aircraft's track. Unfortunately, however, small uncompensated phase changes create significant azimuthal ambiguities. These so-called phase errors result from various factors including, in particular, uncompensated change in the target's range from the mapping aircraft's track. Space borne synthetic aperture radar systems also encounter arbitrary phase error due to ionospheric disturbances.

The problem of the above mentioned phase errors adversely affecting synthetic aperture radar imagery has been addressed by others in the art. Several prominent techniques have been developed. One such technique attempts to produce a fixed order approximation of the phase error by performing an nth order orthogonal polynomial fit to the known phase error function. Such a technique is used by the known Map-Drift algorithm which makes use of two properties of synthetic aperture radar. The Map-Drift algorithm displays a first property in that when the synthetic aperture is divided into a number of sub-apertures, each sub-aperture will develop an image of the same terrain except for a reduction in resolution. A second property is that a linear phase error across the aperture shifts the entire scene in the azimuthal direction. Because of these factors, the Map-Drift technique divides the aperture into several sub-apertures and determines the degree of shifting of the images with respect to each other. The degree of shift between respective images produced from respective sub-apertures is proportional to the quadratic phase error therebetween and from a knowledge of these sub-aperture phase errors the Map-Drift system develops an n-th order polynomial to approximate the total phase error. Thus, the phase error can be determined by relative image displacements.

Map-Drift is a parametric technique and is described, for example, in the publication entitled "Some Methods For Reducing Propagation-induced Phase Errors In Coherent Imaging Systems, I. Formalism." by Warren C. Brown and Dennis C. Ghiglia, published June 1988 in the Journal of the Optical Society of America, Vol. 5. In particular, on page 927, this known method is described. An nth order polynomial is constructed from this phase error. Due to the constraints of such a Map-Drift technique, the algorithm is limited to the development of about a fifth-order polynomial to compensate for existing phase error. Accordingly, Map-Drift cannot accurately compensate for higher order phase errors which degrade azimuthal performance of synthetic aperture radar imaging.

Another technique utilized to compensate for phase errors in synthetic aperture radar is the so-called prominent-point technique. The Prominent-Point algorithm exploits a fundamental property of linear systems. A linear system is completely described by its impulse or point response. When the synthetic aperture image includes a dominant, point signature which can be isolated from the background, the degree of phase error degradation of the image can be estimated from the degree of degradation of the image at this point. By filtering the image with the inverse of the error, the phase error can be substantially eliminated. However, the Prominent-Point compensation fails when the degraded scene does not contain a strong isolated point signature or when the point signature cannot be separated from other interfering sources. Accordingly, Prominent-Point compensation cannot readily operate without strong point reflections.

While the above mentioned phase error problems occur in synthetic aperture radar imaging, other types of synthetic aperture imaging may encounter similar problems. For example, synthetic aperture sonar can encounter the phase errors discussed above. These errors can be readily and accurately corrected by the teachings of the present invention.

Subsequent to the discovery of the present invention, the applicants have discovered that the present invention utilizes processing techniques similar to the process techniques previously used for the removal of "blur" in long exposure optical images produced by ground-based optical telescopes due to atmospheric fluctuations. This so-called stellar speckle processing utilizes mathematical techniques similar to those developed by the inventors. However, substantial differences exist between such stellar processing techniques and the concepts of the present invention. In the known stellar processing techniques, in order to resolve the star images of interest, a number of short exposures of the object of interest are produced with each exposure "freezing" the atmosphere so that the image is not blurred. However, due to the atmospheric fluctuations, each exposure image does not individually represent the object of interest. Digital processing of hundreds of speckle images can mitigate the effects of the change in atmosphere and produce a diffraction limited image of the object common to each speckle image. In such stellar processing the phase error inducing atmospheric fluctuations vary over time while the image remains unchanged. In contrast, in synthetic aperture imaging the phase error for each image is time invariant while the imaged target varies. Thus, the phase error in a synthetic aperture radar image is redundant in the degraded image. Each target portion in the image is degraded by the same phase error and this redundancy may be used to extract the phase error information from the image. Further, synthetic aperture radar imaging offers the advantage that the complex imagery may be stored, thus allowing phase correction iterations which cannot be performed in the so-called speckle processing used for optical correction of blur in the viewing of stellar images. In contrast, in speckle imaging, it is the image scene which is redundant in the multiple speckle images with the phase error varying throughout. This leads to substantial distinctions in the imaging and its correction as utilized in these two systems.

OBJECTS OF THE INVENTION

It is an object of the present invention to accurately and efficiently compensate for arbitrary phase errors in a synthetic aperture imaging system.

It is another object of the present invention to correct such arbitrary phase errors in aircraft borne synthetic aperture radar.

It is another object to correct such arbitrary phase errors in space-borne synthetic aperture imaging systems.

It is another object of the present invention to compensate for arbitrary, two-dimensional phase errors in synthetic aperture imagery.

It is still another object of the present invention to compensate for such phase errors with a high degree of accuracy using computational techniques which are capable of being performed substantially in real time.

It is a further object of the present invention to compensate for the above mentioned phase errors in synthetic aperture images independent of image content.

It is a further object of the present invention to eliminate the need to break up the full aperture for an SAR image frame into sub-apertures to provide order-based estimation and correction as is utilized in the Map-Drift technique.

It is a still further object of the present invention to exploit the redundant phase error information contained in the degraded imagery to obtain a linear, unbiased, minimum variance estimate for the phase error.

It is a still further object of the present invention to produce a phase correction system for use in correcting arbitrary phase errors in synthetic aperture imagery which is readily implementable through the use of current digital signal processing (DSP) technology.

SUMMARY OF THE INVENTION

The above mentioned objects of the present invention are accomplished by virtue of the novel phase gradient autofocus implementation to synthetic aperture imagery. The autofocus method and system of the present application utilizes range compressed data, azimuth compresses each range line of this data, and circularly shifts the maximum magnitude sample in each range line or bin n to the origin to center the highlight points of the image. The system then estimates the degree of smearing by determining a processing window, computes a weighted least square's estimate of the phase error by summing the imaginary components of the product of the complex phase history derivative and complex conjugate of the azimuth phase history data of each range line divided by the sum of the squares of the absolute values of the azimuth phase history data of each range line. Thus, in essence, the system of the present invention locates the highlights of an image frame for each range line and determines the dominant blur associated with those highlights. The dominant blur signatures (image highlights) of each range bin are subsequently processed by performing a weighted least square's estimate of the derivative (gradient) of the phase error function. This produces an estimate of the function causing the blur or defocus. Through iterative processing, the phase error function is gradually removed from the image until an optimum image is obtained. The process of the present invention may also be performed to correct arbitrary two-dimensional phase errors.

BRIEF DESCRIPTION OF THE DRAWINGS

The embodiments of the present invention are illustrated in the attached drawings where:

FIGS. 5(A-B) are flowcharts of a two-dimensional embodiment of the phase gradient autofocus algorithm of the present invention.

DETAILED DESCRIPTION OF THE PREFERRED EMBODIMENTS

Figure 1:
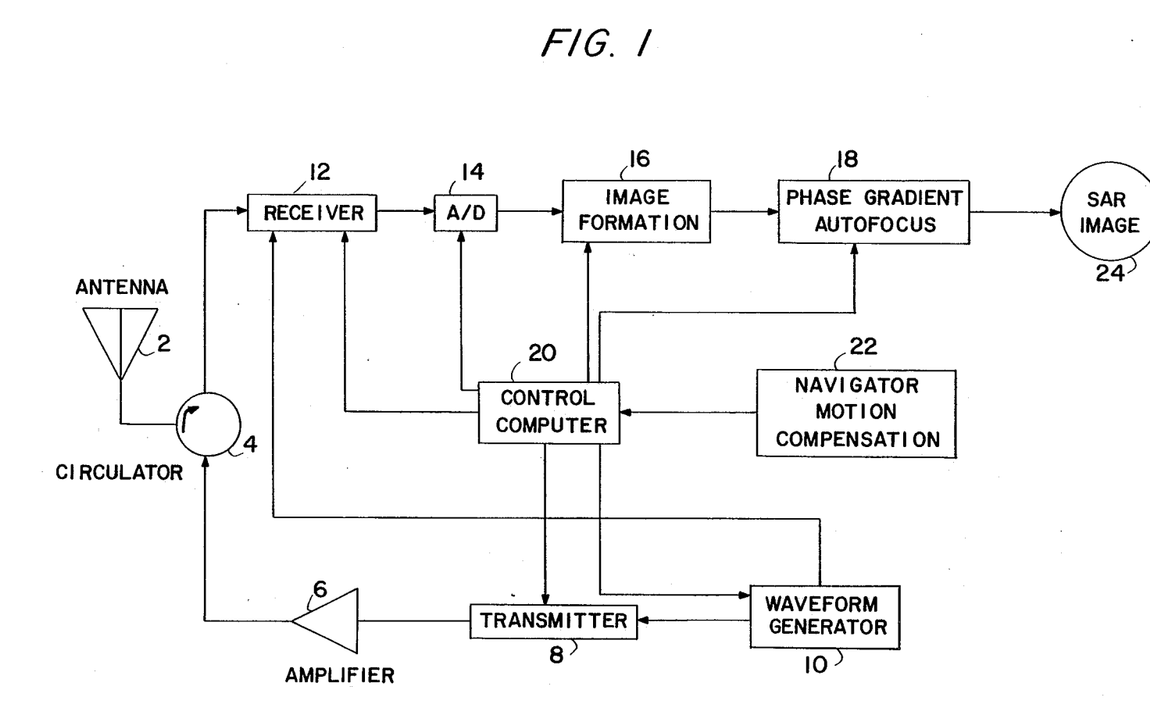
FIG. 1 is a schematic illustrative of a synthetic aperture radar (SAR) employing the phase gradient autofocus as taught by the present application.

An understanding of the present invention may be more easily had by reference to a preferred embodiment of the present invention as it would be utilized with an otherwise conventional synthetic aperture radar imaging system. FIG. 1 illustrates a synthetic aperture imaging system, which in the preferred embodiment would be an aircraft synthetic aperture radar imaging system for terrain mapping. The phase gradient autofocus according to the teachings of the present invention is utilized, in the embodiment of FIG. 1, in a synthetic aperture radar which is otherwise conventional. The phase gradient autofocus system of the present invention utilizes the algorithm of FIG. 2 to perform phase correction to produce desired image correction. It should be understood, however, that the embodiment of FIG. 1 is generally conventional other than the inclusion of the novel phase gradient autofocus system 18 which processes the synthetic aperture radar image according to the flowchart of FIG. 2, according to the teachings of the present invention. The remainder of the synthetic aperture radar, however, is conventional and would be constructed or modified as would occur to one of ordinary skill in the art.

To understand the phase gradient autofocus manufactured according to the teachings of the present invention, however, it is desirable to generally understand the operation of a synthetic aperture radar system which may incorporate such a phase gradient autofocus system. Such a system utilizing techniques of the present invention may be seen in FIG. 1.

In a synthetic aperture radar system such as that utilized in FIG. 1, a single time shared radar antenna 2 which is of relatively small dimension is utilized to both transmit image interrogation pulses and receive position indicating reflections. Through the sequential generation of image interrogation pulses and receipt of position indicating reflections a relatively long antenna is synthesized due to the distribution of transmitted pulses caused by the movement of the aircraft or other vehicle bearing the antenna along a selected track. Alternatively, a stationary antenna may be utilized to resolve the image of a moving target using known inverse synthetic aperture radar (ISAR) imaging techniques.

The antenna is provided with transmitted image interrogation pulses produced by a transmitter 8 which supplies these pulses to an amplifier 6 for amplification and subsequent supply to the antenna 2 through a circulator 4. A waveform generator 10 is provided for generating a pulse waveform to be transmitted by the transmitter 8. Typically, the waveform generator 10 develops pulses for transmission which are encoded in linear FM chirps. Although constant frequency impulses will provide satisfactory image resolution, such FM chirped pulses of extended duration reduce peak transmitter power without a reduction in average power transmission. For example, this linear frequency modulated chirp signal may be developed by a voltage controlled oscillator having a ramp waveform supplied at the input thereof so as to produce a linearly increasing frequency "chirp" of a desired pulse width.

Figure 3A:
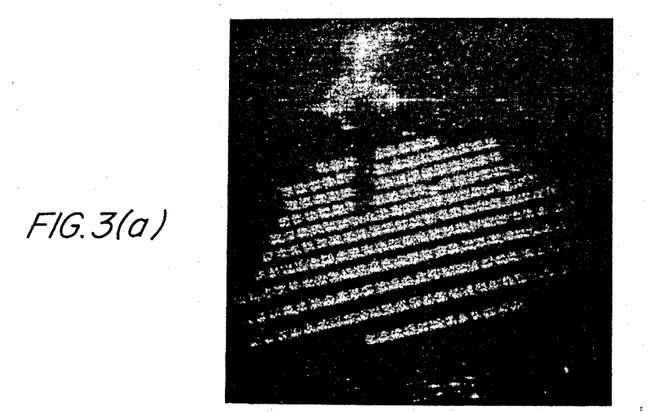
FIG. 3(a) is an image produced by a conventional synthetic aperture radar system with an uncompensated one-dimensional phase error.

These linear FM chirp pulses are supplied not only to the transmitter 8 but also to the receiver 12 which performs coherent detection in a well known manner. Accordingly, the receiver 12 utilizes the same waveform generated by waveform generator 10 and provided to transmitter 8 to aid in a determination of both range and cross-range. The receiver multiplies the chirp pulse produced by the waveform generator 10 with the received signal to determine the frequency difference therebetween which is indicative of target range. The output of the receiver 12 is analog-to-digital converted by A/D converter 14 and provided to an image formation system 16 of the synthetic aperture radar. The image formation system 16 uses the time/frequency information indicative of range to determine one dimension (range) of the image to be reconstructed and uses the phase difference between successive samples to determine the orthogonal dimension (azimuth or cross-range) of the target. As mentioned above, the azimuth or cross-range is extremely sensitive to uncompensated phase errors which cause an azimuthally oriented smearing of the image. This is due to the phase errors caused by small changes in range between successive samples. Since the azimuth information is determined on the basis of change in range, even minor inaccuracies in range between the successive samples can cause phase errors which result in large azimuth errors. Accordingly, as illustrated in FIG. 3(a) which shows a conventional synthetic aperture radar image without phase compensation, there is a substantial amount of phase error-induced "smearing" in the azimuth or cross-range dimension.

Figure 4:
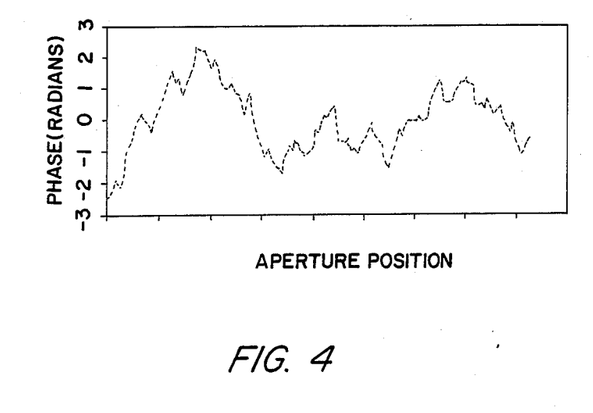
FIG. 4 is a graphical illustration of the typical one-dimensional phase error for an aperture having 512 samples.

The SAR system of FIG. 1 further includes a navigation motion compensation system 22 which, in the preferred embodiment, utilizes the inertial navigation system of the aircraft to continuously determine aircraft position and compensate for coarse phase errors between successive samples due to deviation of aircraft position from the intended track. However, even the most sensitive of such navigator motion compensation systems cannot compensate for the errors on the order of the rf wavelength which creates sufficient phase errors so as to cause substantial phase degradation in the azimuth direction. Accordingly, even with such navigator motion compensation provided by the navigator motion compensation system 22, substantial phase error-originated smearing of the image exists as is illustrated in FIG. 3(a) which demonstrates this one dimensional phase error. A typical phase error encountered in synthetic aperture imaging at successive aperture positions is illustrated in FIG. 4.

In the image formation system 16 of FIG. 1, a number of other forms of compensation would normally be utilized as is known in the art. For example, correction for earth curvature, cell migration and polar to cartesian reformatting may be conducted by the image formation system 16.

The transmitter 8, waveform generator 10, receiver 12, analog/digital converter 14, and image formation system 16, of FIG. 1, are operated under control of a control computer 20 which performs this control in a manner known in the art. The control computer 20 selects various parameters of the waveform generator 10, transmitter 8 and receiver 12 to image a desired patch of terrain and to focus the antenna to the desired range in a manner also known in the art.

Although the aforementioned elements of FIG. 1 are otherwise conventional, Applicants have invented a novel, phase gradient autofocus system to substantially compensate for phase errors in the azimuth dimension in the case of airborne mapping techniques, or two-dimensional phase errors if appropriate. The phase gradient autofocus system 18 of FIG. 1 under control of the control computer 20 implements the algorithm of FIG. 2 to compensate for the aforementioned phase errors. Substantial improvements over the phase error compensation of Map-Drift and Prominent-Point techniques as described in the Background of the present application are produced according to the teachings of the present invention.

Figure 2:
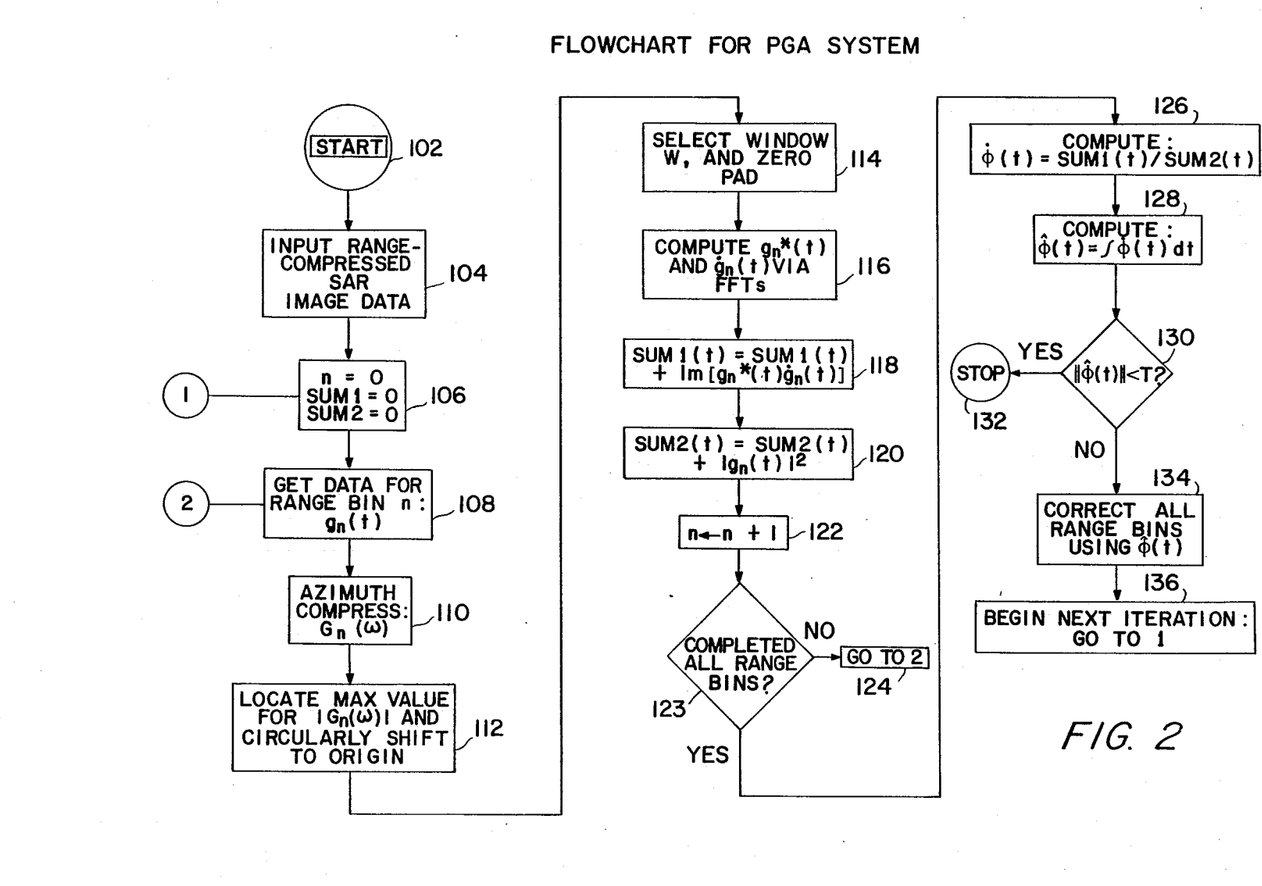
FIG. 2 is a flow chart of a one-dimensional embodiment of the phase gradient autofocus algorithm used in the present invention.

Turning now to FIG. 2 of the present application, the phase gradient autofocus system of the present invention which is readily implementable with current digital signal processing (DSP) chip technology is disclosed in detail. The algorithm of the embodiment of FIG. 2 assumes that raw synthetic aperture radar image data is introduced thereto prior to azimuth data compression. In other words, in the embodiment of FIGS. 1 and 2, the image formation system 16 has already performed range compression. Range-compressed phase-history domain data are described as:

$$g_n(t) = |g_n(t)|e^{\{j[\phi_n(t)+\phi_E(t)]\}}$$
$$= 0$$

for $|t| \leq T/2$ otherwise
where
n is the range bin index;
t is the relative time along the synthetic aperture,
$|g_n(t)|$ and $\phi_n(t)$ are the magnitude and phase, respectively, of the range-compressed data for range bin n, and
$\phi_\epsilon(t)$ is the uncompensated phase error which is common to all range bins of interest and independent of n.

The phase gradient autofocus algorithm of FIG. 2, upon starting at step 102, proceeds to a step 104 in which the range compressed synthetic aperture radar image data $g_n(t) = |g_n(t)|e^{\{j[\phi_n(t)+\phi_\epsilon(t)]\}}$ for $|t| \leq T/2$ is introduced into the phase gradient autofocus system. At step 106, two subtotals SUM1 and SUM2 are initialized to zero as is the counter n.

At step 108, each line of range data, $g_n(t)$, corresponding to a line of range data (known as a range "bin") is recalled from memory. Since n is initialized at zero, the range bin for the zero line of range data is first obtained. This data is then azimuth compressed by taking the fast Fourier transform of this line of data as is well known in the art.

After azimuth compression, each line of image data consists of a sum:

$$G_n(\omega) = \tau\{g_n(t)\} = \Sigma_m H(\omega)*a_{m,n}s(\omega - \omega_{m,n}) \quad (2)$$

where $H(\omega) = \tau\{e^{j\phi(t)}\}$ is the transform of the aperture phase error function,
the $a_{m,n}s(\omega - \omega_{m,n})$ are the target induced impulse response functions,
and the asterisk denotes convolution.

In step 112 of the algorithm of FIG. 2, this line of data $G_n(\omega)$, is evaluated and the maximum image intensity is numerically determined and circularly shifted to a predetermined location, for example, the origin or the central axis of the image. The purpose of the shifting operation is to align the maximum signal levels detected from the image into a narrower, columnar array so that processing of other image data not critical to determining the phase gradient can be avoided.

Once the circular shifting operation at step 112 has been completed, the maximum value data shifted to the origin is evaluated to select a processing window in step 114. This window is selected so as to preserve the blur associated with the brightest target on any given range bin or line for the subsequent steps while eliminating or zero-padding (setting to zero) the remaining signals to reduce errors in the estimation process by eliminating extraneous data. This allows the phase error estimation to proceed using only input data having the highest signal-to-noise ratio. Zero padding has the secondary advantage of eliminating the need to process data which is not highly relevant, simplifying the processing thereof. The selection of the proper window size, W, selected in step 114 may be according to any appropriate criteria which distinguishes between the data associated with the dominant blur of that data line and the surrounding clutter. This is possible as the phase error to be corrected is redundant in the image with the targets within a single frame all subjected to an identical blurring function. It is therefore possible to estimate the width of the blur, W, by registering the dominant blur on each range bin and averaging over the total number of bins as will be done in later steps.

While W can be estimated using a variety of methods, in the preferred embodiment, W is estimated by selecting the 10 dB threshold points from the sum over n of the maximum value of the circularly shifted $|G_n(\omega)|$, located in step 112. Thus, a window of a predetermined number of samples is established in step 114.

In step 116, fast Fourier transformation of the windowed and circularly shifted $G_n(\omega)$ is performed to compute the complex conjugate $g_n^*(t)$ and complex phase history derivative $\dot{g}_n(t)$ using known mathematical processing techniques. The term $g_n^*(t)$ is formed by Fourier Transformation and subsequent conjugation of $G_n(\omega)$, while $\dot{g}_n(t)$ is formed by pre-multiplication of $G_n(\omega)$ by $j\omega$ and subsequent Fourier Transformation in a manner well known to those of the art.

At step 118 of the phase gradient autofocus algorithm, the imaginary portion of the product of $g_n^*(t)\dot{g}_n(t)$ is added to the SUM1(t) which was initialized at zero. In step 120, SUM2(t) is incremented to add the square of the absolute value of $\dot{g}_n(t)$. The iteration number n is then incremented in step 122. In step 123, the counter n is compared to the total number of range lines to be processed. Note that it is not necessary to process all range lines, if a means is included to select only those range lines that contain the largest target signals. If n is less than the total number of lines, steps 108–122 are repeated for each succeeding range line. At the point in which all chosen range bins have been processed according to steps 108–123, SUM1(t) is established:

$$SUM1(t) = \sum_n Im[g_n^*(t)\dot{g}_n(t)] \quad (3)$$

Similarly, at the completion of steps 108–122, SUM2(t) is established as:

$$SUM2(t) = \sum_n |g_n(t)|^2 \quad (4)$$

In step 126 of FIG. 2, a weighted least square's estimate of the derivative of the phase error is calculated by dividing SUM1(t) with SUM2(t) as shown in the following equation:

$$\dot{\phi}_{1s}(t) = \frac{\sum_n Im\{g_n^*(t)\dot{g}_n(t)\}}{\sum_n |g_n(t)|^2} \quad (5)$$

This weighted least square's estimate for a single iteration yields the derivative (gradient) of the phase error. This estimate is then integrated and filtered to develop the estimated phase error function:

$$\hat{\phi}_\epsilon(t) = \int \dot{\phi}_{1s}(t) dt. \quad (6)$$

If the RMS value of the phase estimate (t) is less than a desired threshold as determined in step 130, the process is terminated. However, if the phase error still exceeds the threshold, in step 134 the phase error estimate $\hat{\phi}_\epsilon(t)$ is removed from the range data of each range line by multiplication by $e^{-j\hat{\phi}_\epsilon(t)}$ as shown in step 134. This completes the phase error correction performed by the phase gradient autofocus according to the teachings of the present invention for a single image frame. Subsequent image frames are similarly processed.

In step 128, the phase error estimate is determined by integrating the weighted least square's estimate of the phase gradient and performing filtering, if appropriate. Post filtering of the function $\hat{\phi}_\epsilon(t)$ is useful in certain situations where a priori knowledge of the phase error exists. For example, we may know that the phase error is a sample function from a stochastic process for which we know the first and second order statistics. In such a case, we can use well known filtering techniques to further enhance $\hat{\phi}_\epsilon(t)$. This is normally not the case in synthetic aperture radar but might exist when correcting phase error in other systems. Typically, the only filtering or post processing of $\hat{\phi}_\epsilon(t)$ is to remove any linear phase trend.

Figure 3B:
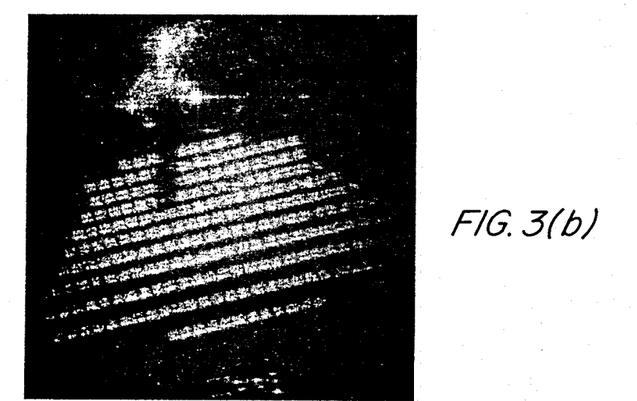
FIG. 3(b) is the image of FIG. 3(a) corrected by application of a fifth order Map-Drift technique.
Figure 3C:
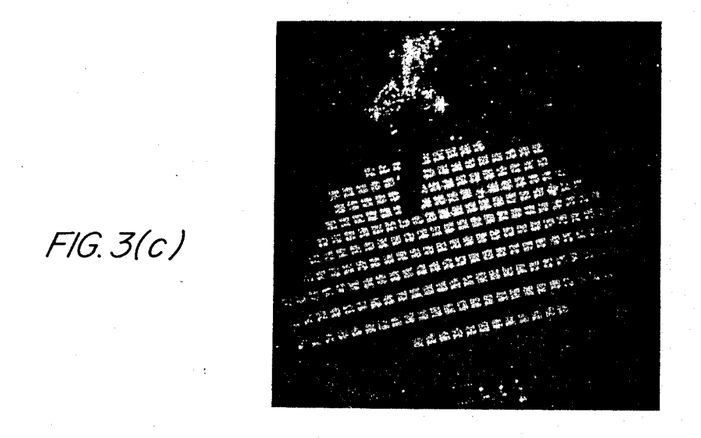
FIG. 3(c) is the image of FIG. 3(a) corrected according to the teachings of the present invention.

The above mentioned phase gradient autofocus phase correction system corrects for the problem of uncompensated phase stability and coherence over an aperture being synthesized in order to remove phase related aberrations from the imagery. In the above mentioned one-dimensional example, the present invention provides substantial improvements over conventional Map-Drift methods as no phase error order need be estimated (the number of sub-apertures need not be determined); as redundancy of azimuth phase errors over many range bins may be explicitly used to improve performance; as, in contrast to Prominent-Point processing, strong, isolated point targets are not required, and the phase correction can be performed even in the presence of a high-clutter background. The phase gradient autofocus of the present invention also provides for correction of redundant phase errors in the range dimension if appropriate. A demonstration of the improvement exhibited by the system of the present invention can be seen by a comparison of FIGS. 3(b) and 3(c). FIG. 3(b) illustrates a fifth order correction using the known Map-Drift correction technique. In contrast, FIG. 3(c) shows a corrected image obtained with seven iterations of the phase gradient autofocus correction technique according to the teachings of the present invention. As can be seen from a comparison of these two images, substantial enhancement in image detail and reduction of image smear is produced according to the teachings of the present invention.

The above discussed preferred embodiment of the present invention is directed to correction of phase errors in aircraft borne synthetic aperture radar. The above discussed preferred embodiment corrects phase errors resultant from uncompensated motion errors from the aircraft platform and may even correct phase errors during maneuvering of the aircraft platform. Space-borne synthetic aperture radar also exhibits one dimensional phase error which may be corrected by the above discussed system and method as a result of ionospheric or tropospheric induced propagation effects. One dimensional correction as described above may be useful for the correction of other types of one dimensional phase error. For example the system and method of the present invention may be applicable to the correction of sinusoidal errors with frequencies ranging from fractions of a cycle per aperture length to hundreds of cycles per aperture length. The above mentioned system and method may also be useful to correct errors described by a stationary random process having a power spectral density that is power law, or even phase errors of arbitrary structure, even when such errors have a very large magnitude with peak to peak swings of one hundred radians or more.

While the above discussed embodiment applies the teachings of the present invention to the correction of one-dimensional phase error, the teachings of the present invention are equally applicable to the correction of two dimensional phase error. When circumstances arise in which two-dimensional phase correction need be implemented to resolve two-dimensional phase error degraded images. It is further desirable to correct such two-dimensional phase errors.

Figure 5A:
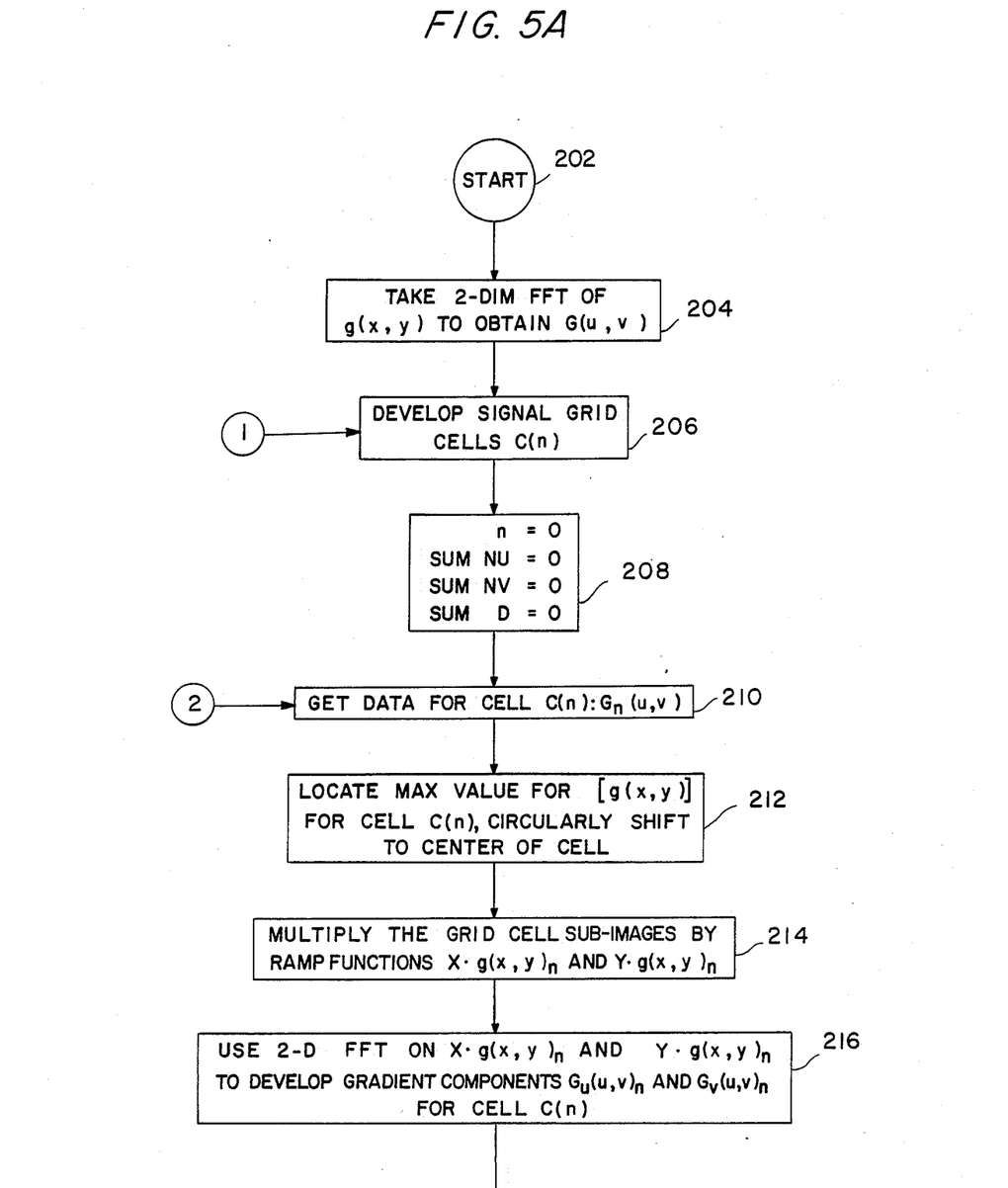
Figure 5B:
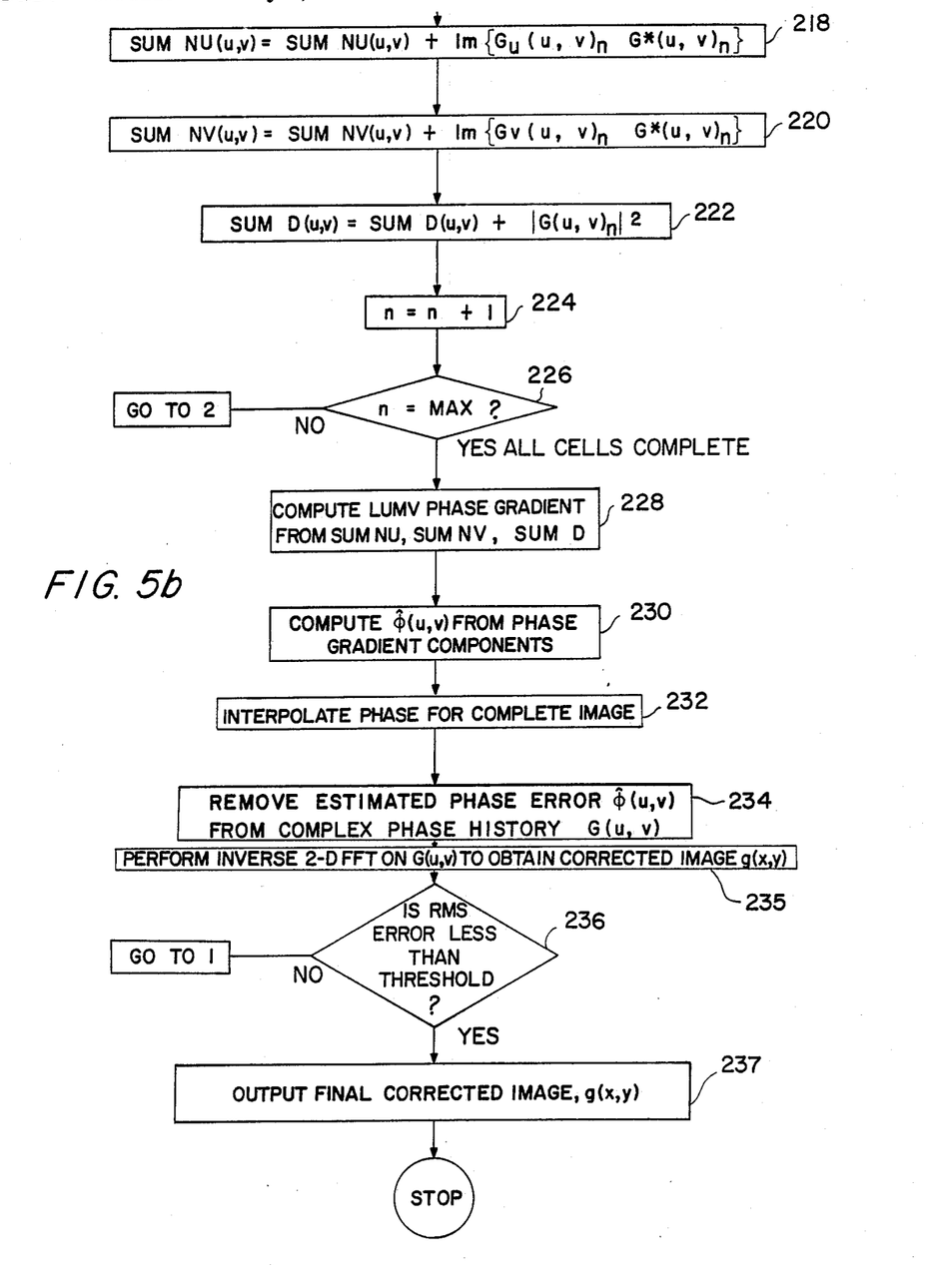

The concepts of the present invention may also be employed to correct for two-dimensional phase error such as that which may occur due to complex maneuvers or large uncompensated transmitter/target motion. An algorithm useable for two-dimensional phase gradient autofocus is illustrated in FIG. 5.

Upon start of the algorithm at point 202, the algorithm takes the two-dimensional fast Fourier transform of the complex image g(x,y) to create a complex phase history G(u,v), which is stored for later use.

$$G(u,v) = \tau\{g(x,y)\} \quad (7)$$

Whereas the one dimensional phase gradient autofocus algorithm utilized range lines as discrete processing elements, the implementation of two-dimensional synthetic aperture radar phase correction entails the division of a single synthetic aperture radar image into an ensemble of n grid cells, C, to extract the phase error responsible for image misfocus from each cell individually. The phase error, or equivalently, the point spread function, is the redundant information existent in each grid cell. focus the image. These square grid cells should be large enough to encompass any prominent points including their side lobe structure, yet small enough to yield many samples of the redundant point spread function. The cells are zero-padded to a size at least twice the next larger power of two to avoid aliasing in the phase history domain when computing $G_u(u,v) \cdot G^*(u,v)$ using fast Fourier transforms later in the algorithm. While in the embodiment described with regard to FIG. 5, the grid cell size is retained constant through subsequent iteration, the grid cell size may be changed for each iteration, if desired.

Referring now to FIG. 5, which illustrates the two-dimensional embodiment of the phase gradient autofocus algorithm utilizable in accordance with the teachings of the present invention, the algorithm starts at block 202 and proceeds to take the two-dimensional fast Fourier transform of the complex image data $g(x,y)$ to obtain the complex phase history $G(u,v)$ thereof at step 204. The complex image is then divided into a number of square grid cells $C(n)$ in the manner described above in step 206. After the grid cells are defined in step 20B, the counters and sums utilized in the program are initialized in a step 208 similar to step 106 of the algorithm of FIG. 2. Subsequently, the data for each individual cell is recalled, the two-dimensional embodiment of FIG. 5 relying on the complex phase history data $G_n(u,v)$.

In step 212, the maximum value for $|g_n(x,y)|$ in the cell $C(n)$ is determined and this maximum value is circularly shifted to the center of the cell. In step 214, the grid cell sub images are multiplied by ramp functions $x \cdot g(x,y)_n$ and $y \cdot g(x,y)_n$, respectively. In step 216, a two-dimensional fast Fourier transform is utilized to develop derivatives (or gradient components) $G_u(u,v)_n$ and $G_v(u,v)_n$. In steps 218-222, SUMNU(u,v), SUMNV(u,v) and SUMD(u,v) are developed where:

$$SUMNU(u,v) = \sum_n Im\{G_u(u,v)_n G^*(u,v)_n\} \quad (8)$$

$$SUMNV(u,v) = \sum_n Im\{G_v(u,v)_n G^*(u,v)_n\} \quad (9)$$

$$SUMD(u,v) = \sum_n |G(u,v)_n|^2 \quad (10)$$

In step 224, the number n is incremented and in step 226, it is determined whether n is equal to the total number of cells or maximum number of cells. If each cell has not been processed as described above, the program returns to point 2. If all cells are complete, then in step 228, the linear unbiased minimum variance (LUMV) phase gradient is estimated as follows:

$$\hat{\phi}_u(u,v) = \frac{\sum_n Im\{G_u(u,v)_n G^*(u,v)_n\}}{\sum_n |G(u,v)_n|^2} \quad (11)$$

and $$\hat{\phi}_v(u,v) = \frac{\sum_n Im\{G_v(u,v)_n G^*(u,v)_n\}}{\sum_n |G(u,v)_n|^2}$$

In step 230, the estimated phase error $\phi(u,v)_\epsilon$ is determined from the phase derivatives. In the preferred embodiment, this is done with a fast Poisson solver rather than Jacobi iteration or successive over-relaxation. This is described in further detail in the paper entitled "Efficient FORTRAN Subprograms for the Solution of Elliptic Partial Differential Equations." by Swartztrauber, R. Sweet, Report NCAR-TN/1A-109, National Center Atmospheric Research, Boulder, Colo., 1975. After an estimated phase error is established for the aggregate of the n cells C, this phase error estimate obtained must be interpolated to a sampling grid equal to the size of the full complex phase history. Since the phase was estimated over a grid consistent with the smaller size of each cell, C, phase correction must be performed over a grid equal in size to the full phase history. This is accomplished in step 232. Subsequently, in step 234, the estimated phase error is removed from the complex phase error history $G(u,v)$ by multiplying $G(u,v)$ by $e^{-j\hat{\phi}_\epsilon(u,v)}$ to form revised complex phase error history $G(u,v)$. At step 235, the inverse two-dimensional fast Fourier transform of $G(u,v)$ is performed to obtain the partially corrected image $g(x,y)$. If the RMS error exceeds the threshold as determined by step 236, the above mentioned procedure is iterated by returning to point 1 (step 206) and reinitiating the correction at step 208. If desired, different square grid cells $C(n)$ can be established by returning to point 1 at step 206 instead of step 208. However, in the preferred embodiment, constant sized square grid cells are utilized throughout the correction process. Subsequently, once the error has been reduced to below a threshold, the corrected image $g(x,y)$ is output as illustrated in step 237.

While the two-dimensional case is computationally more complex than the one-dimensional case, it can be seen from a comparison of FIGS. 2 and 5, respectively, that both one dimensional correction and two-dimensional correction utilize the same principles in accordance with the teachings of the present invention.

From the above mentioned description, it is apparent that the disclosed phase gradient autofocus system for use in synthetic aperture imagery exhibits significant advantages over the prior art Map-Drift and Prominent-Point autofocus algorithms. From the above mentioned advantages and the attendant descriptions of the preferred embodiments, it is apparent that this system significantly improves synthetic aperture imaging. While the preferred embodiments are directed to radar mapping, the teachings of the present invention are equally applicable to sonar or other similar forms of imaging, as would readily occur to one of ordinary skill in the art. Indeed, the teachings of the present application can be extended as would occur to one of ordinary skill in the art and various modifications to the techniques described in the present application are contemplated by the inventors and are within the scope of the present application as defined in the appended claims. Of course, the scope of the present application is to be determined solely by the scope of the appended claims.

We claim:

1. A synthetic aperture radar comprising:
   a directional radar antenna directed at a target area to be imaged and displaying relative movement with respect thereto;
   means for supplying radar interrogation pulses to said antenna;
   image formation processing means for receiving position indicating reflections from said target area and comparing said position indicating reflections with said interrogation pulses produced by said means for supplying, said image formation processing means using multiple samples of said position indicating reflections to develop target range and azimuth data representative of a target image;
   at least one of said target range and azimuth data exhibiting arbitrary phase error between said samples, resulting in smearing of the target image; and phase correction autofocus means for estimating and subtracting said phase error from said target image, said phase correction autofocus means including, autofocus processor means for,
(a) dividing said target image into a plurality of target image portions,
(b) locating the strongest highlight in each of said target image portions,
(c) estimating the width of the smearing of each highlight in each dimension of said phase error for each of said target image portions,
(d) estimating of the phase error in each said dimension thereof from said estimated smear width of said highlights, and
(e) compensating for said phase error in said target image to produce compensated data for said target image.

2. The synthetic aperture radar of claim 1 wherein said radar is aircraft borne,
said phase error being arbitrary phase error causing smear in said target image in said azimuthal direction.

3. The synthetic aperture radar of claim 1 wherein said radar is space borne.

4. The synthetic aperture radar of claim 2 wherein said target image portions divided from said target image by said autofocus processor means are range bins of said target image.

5. The synthetic aperture radar of claim 4 wherein said autofocus processor means further circularly shifts said strongest highlight to a central part of each said target image portion;
said autofocus processor means zeroing the parts of each image portion outside the estimated smear width thereof to reduce extraneous errors in said autofocus processor.

6. The synthetic aperture radar of claim 1 wherein said autofocus processor means iteratively performs said steps b-e;
said autofocus processor means further compares the estimated phase error of each iteration of steps b-e to a threshold, ending the iteration and producing said compensated data for said target image when said estimated phase error is less than said threshold.

7. The synthetic aperture radar of claim further comprising display means for displaying said target image from said compensated data.

8. The synthetic aperture radar of claim 1 wherein said image formation processing means compresses at least on of said target range and azimuth data by performing Fourier transformation to the frequency domain.

9. The synthetic aperture radar of claim 1 wherein both said range and azimuth data developed by said image formation processing means exhibit phase error.

10. The synthetic aperture radar of claim 9 wherein said target image portions divided from said target image by said autofocus processor means are rectangular cells C.

11. The synthetic aperture radar of claim 10 wherein said autofocus processor means further circularly shifts said strongest highlight to a central part of each said target image portion;
said autofocus processor means zeroing the parts of each image portion outside the estimated smear width thereof to reduce extraneous errors by said autofocus processor means.

12. A method of producing an image of a target object from radar signals transmitted and received from a radar antenna exhibiting movement relative to said target comprising:
(a) transmitting radar interrogation signals from said antenna moving relative to said target object;
(b) receiving position indicating reflections from said target object produced from said radar interrogation signals;
(c) comparing said position indicating reflections with said interrogation signals and using multiple samples of said position indicating reflections to develop target range and azimuth data representative of a target image, at least one of said target range and azimuth data exhibiting phase errors between said samples, resulting in smearing of the target image; and
(d) estimating and subtracting said phase error from said at least one of said target range and azimuth data to produce a phase corrected target image by,
(1) dividing said target image into a plurality of target image portions,
(2) locating the strongest highlight in each of said target image portions,
(3) estimating the width of the smearing of each highlight in each dimension of said phase error for each of said target image portions,
(4) estimating of the phase error in each said dimension thereof from said estimated smear width of said highlights, and
(5) compensating for said phase error in said target image to produce compensated data for said target image.

13. The method of claim 12 wherein said radar is aircraft borne,
said phase error being arbitrary phase error causing smear in said target image in said azimuthal direction.

14. The method of claim 13 wherein said target image portions divided from said target image are range bins of said target image.

15. The method of claim 14 wherein said step d of estimating and subtracting further includes circularly shifting said strongest highlight to a central part of each said target image portion, and
zeroing the parts of each image portion outside the estimated smear width of each image frame reduce extraneous errors.

16. The method of claim 12 further comprising:
(e) iteratively performing said sub-steps 2-5 of said step (d) of estimating, and
(f) comparing the estimated phase error of each iteration of sub-steps 2-5 of said step (d) of estimating to a threshold and ending the iteration and producing said compensated data for said target image when the estimated phase error is less than said threshold.

17. The method of claim 12 further compressing displaying said target image from said compensated data.

18. The method of claim 12 wherein both said range and azimuth data developed by said image formation processing means exhibit arbitrary phase error.

19. The method of claim 18 wherein said sub-step (1) of said step (d) of estimating divides said target image into image portions formed as rectangular cells C.

20. A system of correcting phase error in a synthetic aperture imaging system which develops range and azimuth data of individual image frames, at least one of said range and azimuth data exhibiting phase error resulting in smear of the image formed thereby, said system comprising:
- input means for receiving said range and azimuth data from said synthetic aperture imaging system;
- means for dividing said target image into a plurality of target sub-image portions;
- highlight locating means receiving each sub-image portion developed by said means for dividing and locating the strongest highlight therein;
- first means for estimating the amount of phase error in each sub-image portion by estimating the degree of smear of the brightest highlight contained therein;
- second means for estimating the phase error in said image frame from the aggregate processing of the image error for each sub-image portion; and
- correction means for removing the estimated phase error from the target image frame.

21. Then system of claim 20 further comprising error threshold determining means for determining whether said phase error estimated by said second means is less than a predetermined threshold;
- said highlight locating means, first means, second means, and correction means iteratively operating until said error threshold determining means determines that phase error correction of that target image is completed.

22. The system of claim 20 further comprising display means for displaying each said target image.

23. The system of claim 21 wherein said phase error is one dimensional arbitrary phase error causing one dimensional smear in said target image;
- said means for dividing forming said target sub-image portions from range bins of said target image.

24. The system of claim 23 wherein said highlight locating means further circularly shifts the strongest highlight in each sub-image portion to a central position thereof.

25. The system of claim 21 wherein said phase error is two dimensional phase error;
- said means for dividing and forming said target image portions as rectangular cells C.

26. The system of claim 25 wherein said highlight locating means further circularly shifts the strongest highlight in each sub-image portion to a central position thereof.

27. A method of correcting phase errors in a synthetic aperture imaging system which develops range and azimuth data of individual image frames, at least one of said range and azimuth data exhibiting phase error resulting in smear of the image formed thereby, said method comprising:
- (a) dividing said range and azimuth data representing a single image frame into a number of data portions defining sub-image portions;
- (b) determining the brightest highlight in each sub-image portion;
- (c) using the brightest highlight in each sub-image portion to estimate phase error induced image smear for each sub-image portion of said image frame; and
- (d) estimating the phase error in said single image frame 15 from the aggregate processing of the estimated image smear of each said sub-image portion; and
- (e) removing the estimated phase error from said range and azimuth data defining said single image frame to form a phase error corrected image.

28. The method of claim 27 further comprising:
- (f) determining whether said phase error estimated by said step (d) of estimating is less than a predetermined threshold;
- (g) iteratively performing said steps (b)–(f) until said step (f) determines that the estimated phase error is less than the predetermined threshold, thereby determining that phase error correction of that said target image is completed.

29. The method of claim 28 further comprising displaying each said target image after phase error correction is completed.

30. The method of claim 29 wherein said phase error is one dimensional arbitrary phase error causing one dimensional smear in said target image;
- said step (a) of dividing forming said target sub-image portions from range bins of said target image.

31. The method of claim 30 wherein said step (b) of determining further circularly shifts the brightest highlight in each sub-image portion to a central position thereof.

32. The method of claim 27 wherein said phase error is two dimensional phase error;
- said step (a) of dividing and forming said target image portions as rectangular cells C.

33. The method of claim 32 wherein said step (b) of determining further circularly shifts the brightest highlight in each sub-image portion to a central position thereof.

* * * * *